US008559916B2

(12) United States Patent
Hamada (10) Patent No.: US 8,559,916 B2
(45) Date of Patent: Oct. 15, 2013

(54) COMMUNICATION SYSTEM AND RADIO PROCESSING APPARATUS (75) Inventor: Yutaka Hamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 344 days.

(21) Appl. No.: 13/029,218

(22) Filed: Feb. 17, 2011

(65) Prior Publication Data

US 2011/0312297 A1  Dec. 22, 2011

(30) Foreign Application Priority Data

Jun. 21, 2010  (JP) .................. 2010-140856

(51) Int. Cl.
*H04M 11/00* (2006.01)

(52) U.S. Cl.
USPC .......................................... 455/405

(58) Field of Classification Search
None
See application file for complete search history.

(56) References Cited

U.S. PATENT DOCUMENTS

| 7,315,744 | B2 * | 1/2008 | Achour .................... 455/453 |
| 2007/0060169 | A1 | 3/2007 | Johansson et al. |
| 2007/0178840 | A1 * | 8/2007 | Deguchi ...................... 455/62 |
| 2010/0302964 | A1 * | 12/2010 | Guo ........................... 370/252 |
| 2011/0319085 | A1 * | 12/2011 | Ishii et al. .................. 455/436 |

FOREIGN PATENT DOCUMENTS

| JP | 2007-529127 | 10/2007 |
| WO | 2005/055524 | 6/2005 |

\* cited by examiner

*Primary Examiner* — Olumide T Ajibade Akonai
*Assistant Examiner* — Shantell L Heiber
(74) *Attorney, Agent, or Firm* — Katten Muchin Rosenman LLP

(57) ABSTRACT

A communication system for performing communication between different mobile terminals in different mobile communication systems by allocating different carriers to the mobile communication systems. The communication system includes a shared radio processing apparatus that is shared by the different mobile communication systems and performs radio processing for the different mobile communication systems. The shared radio processing apparatus includes a measuring unit for measuring power of the carriers, a carrier usage determination unit for determining the frequency of carrier usage based on measured values of the carriers, a carrier status determination unit for determining a carrier status indicating whether to allocate one of the carriers to one of the mobile communication systems based on the carrier usage, and a reporting unit for transmitting a carrier status report including the carrier status to the respective mobile communication systems.

10 Claims, 9 Drawing Sheets

COMMUNICATION SYSTEM AND RADIO PROCESSING APPARATUS

CROSS-REFERENCE TO RELATED APPLICATIONS

This patent application is based upon and claims the benefit of priority of the prior Japanese Patent Application No. 2010-140856 filed on Jun. 21, 2010, the entire contents of which are incorporated herein by reference.

FIELD

A certain aspect of the embodiments discussed herein is related to a communication system and a radio processing apparatus.

BACKGROUND

With the strategy of service providers of telecommunications companies and the development of technology, mobile communication systems have been replaced by new ones at intervals of several years to decades to provide new services. For example, 1-G mobile communication systems from the late 1980s to the early 1990s provided services for analog mobile terminals, mainly providing voice services, which were then replaced by 2-G mobile communication systems. 2-G mobile communication systems from the mid-1990s have provided digital voice communication services such as Personal Digital Cellular (PDC), cdmaOne and Global System for Mobile Communications (GSM), and low-rate data communication services such as email services. Since the early 2000s, 3-G mobile communication services such as Wideband-Code Division Multiple Access (W-CDMA) or CDMA2000 have been widely used, providing Internet connections services via packet communications and content distribution services for distributing music, video, games, etc.

Future trends of mobile communications in Japan may involve higher-rate packet communication services provided in new communication systems including Worldwide Interoperability for Microwave Access (WiMAX), eXtended Global Platform (XGP), Long Term Evolution (LTE), and the like, high quality digital voice services in Voice over Internet Protocol (VoIP), or streaming distribution multimedia services, some of which are already available.

By providing the above services via the new communication systems, the telecommunications companies may propose new business models based on higher-rate communications and improve profitability or reduce network maintenance/management cost by introducing a system highly compatible with IP communications.

When a telecommunications company desires to provide users new services via a new communication system to increase the number of users of such services, the telecommunications company may need to continuously provide existing services via an existing system to its users while attempting to increase the number of users of the new services provided via the new communication system.

Note that there is a known technology in which amounts of radio resources to be allocated to different communication systems are optimized based on communication amounts in a target area of a base station (e.g., see Japanese Laid-Open Patent Application Publication No. 2007-529127).

In the mobile communication systems, mobile terminals of the users utilize radio waves as access lines. The communication via the radio waves may consume radio resources. That is, the radio resources that may be effectively utilized within a specific frequency range (or frequency band) are limited. For example, the frequency range suitable for the mobile communications may be specified from 100 MHz to 2.5 GHz. In practice, competing with aeronautical or maritime radio communications, the specified frequency range is not entirely used for the mobile communications. That is, the specific frequency range for the mobile communications may be divided into a number of different carrier frequency ranges for different communication systems.

Allocated with available radio frequency bands, the telecommunications companies may acquire radio resources within the allocated frequency bands to provide users various services. The amount of the radio resources may be determined based on the radio frequency bandwidth and the radio system to be used, and hence the maximum number of service recipients or the transmission rates may be determined based on the determined amount of the radio resources. When the telecommunications company utilizing an existing mobile communication system desires to introduce a new service via a new communication system, the telecommunications company may set up a new telecommunications apparatus procured from a telecommunications apparatus manufacturer to implement the new communication system. However, the telecommunications company may need to acquire available radio resources for the new service that the telecommunications company desires to provide. There may be two methods for acquiring radio resources; namely, (1) a method of allocating a new frequency band for acquiring radio resources; and 2) a method of reallocating the frequency band of the existing communication system to the new system for acquiring the radio resources.

The former method may involve a long-term deliberation for the new frequency allocation or a large investment for securing the frequencies, which may affect the business deployment of the telecommunications companies. The latter method may involve the reduction in the frequency bands already available for the existing services, which may decrease the number of users of the existing services in the existing system or the degradation of service quality.

The following describes the adverse effects that may occur if the frequency band already allocated to the existing system is reallocated to the new system for acquiring the radio resources, and how these effects may be reduced.

Figure 1:
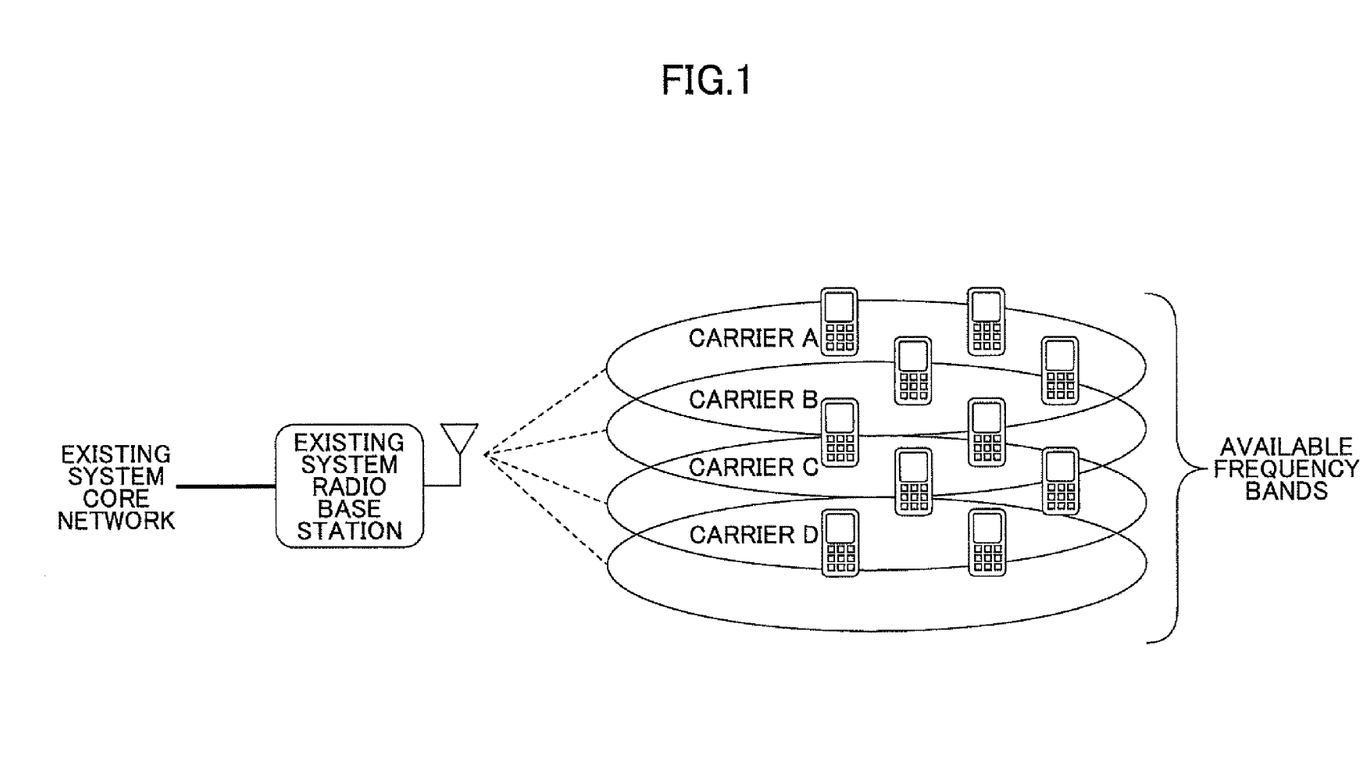
FIG. 1 is a diagram illustrating an example of a service providing area of a mobile communication system.

FIG. 1 illustrates an example of a service providing area of a mobile communication system. The telecommunications companies split the specified frequency band into plural carrier waves or carriers having specified band widths (carriers A, B, C, and D). At least one of the carriers A, B, C, and D is allocated to one service area to provide a corresponding service. The different carriers include different frequency bandwidths based on the different radio systems to which the carriers are allocated. For example, the frequency bandwidth for the cdmaOne system is set at 1.5 MHz whereas the frequency bandwidth for the W-CDMA is set at 5 MHz.

Among the recent mobile communication systems, one of the main-stream multiple access systems is code division multiple access (CDMA). In the CDMA system, multiple users share the same carrier frequency to transmit information using different codes, and each carrier may support dozens of users.

Figure 2:
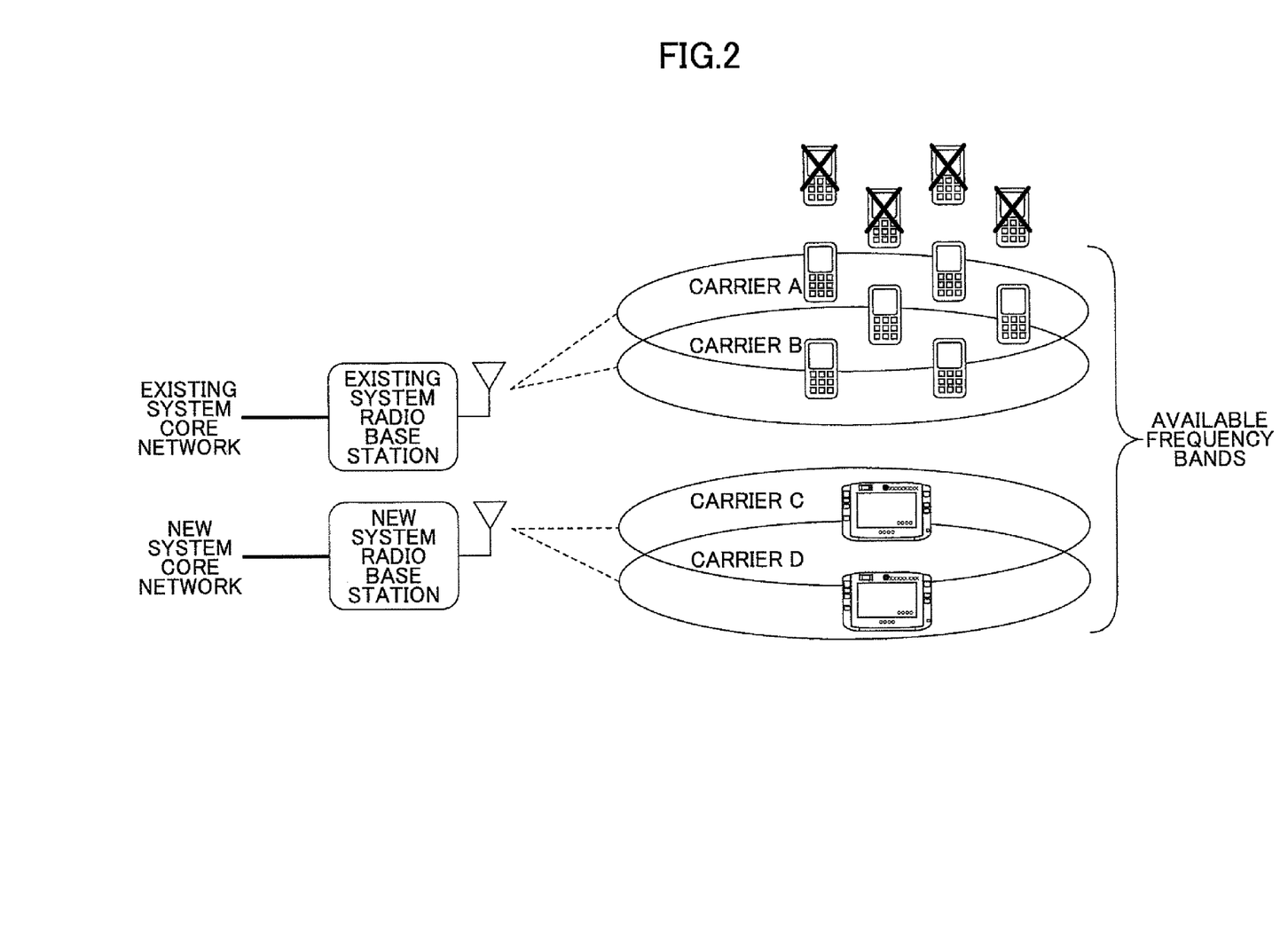
FIG. 2 is a diagram illustrating another example of a service providing area of a mobile communication system.

FIG. 2 illustrates an example of service providing areas of a communication system when some of the carriers allocated to the existing system are reallocated to a new system to provide a new service in the new system. In the example of FIG. 2, the carriers C and D selected from the carriers A, B, C, and D that have been allocated to the existing system are reallocated to the new system to formulate the service providing areas.

When some of the carriers allocated to the existing system are reallocated to the new system, the radio resources available for the existing system are reduced, and hence, the maximum number of users utilizing the exiting service in the target service providing area of the existing service may be reduced. For example, if 20 users are covered by one carrier, 80 users are covered by four carriers in the existing service providing area. However, after the relocating some (i.e., carriers C and D in this case) of the carriers to the new system, the existing service providing area may merely support up to 40 users, thereby imposing an adverse effect on the existing system.

In the mobile communication systems, the same mobile terminal changes its locations over time, and hence the mobile terminal preferably receives same services at different times in different areas. The coverage of the service area in the mobile communication is one of the important factors for a user to select a telecommunications company to subscribe to a mobile phone of that telecommunications company. Accordingly, when the telecommunications companies start providing services with a new system, the frequency reallocation from the existing system to the new system may be simultaneously implemented in a number of different areas to eventually acquire a wider service providing area for the new system. The acquisition of the wider service providing area may be an important factor for increasing the number of prospective users utilizing the service in the new system to make a profit.

Figure 3:
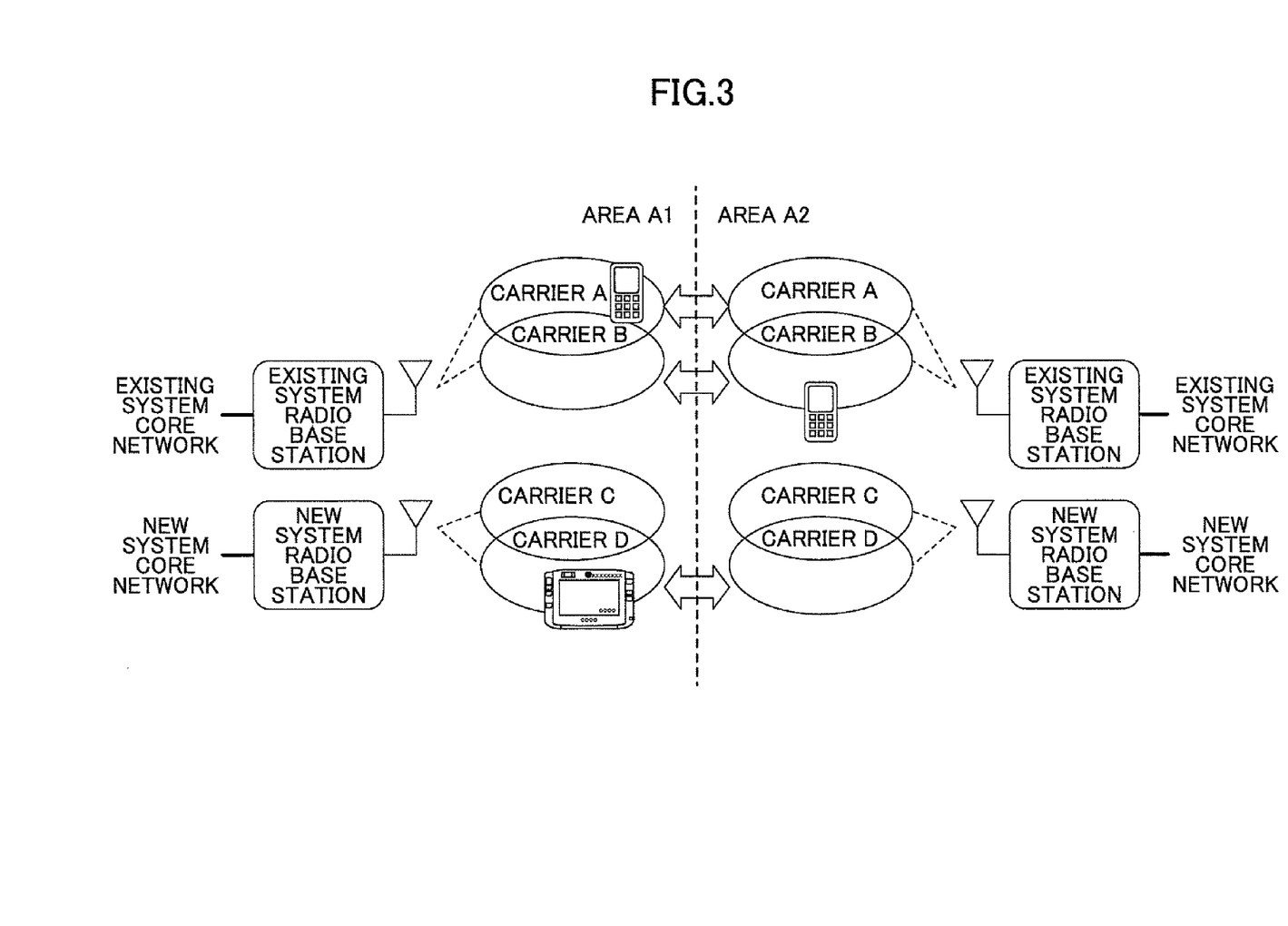
FIG. 3 is a diagram illustrating an area configuration example of plural areas.

FIG. 3 illustrates area configuration examples of plural service providing areas in which some of the carriers allocated to the existing system are reallocated to the new system to provide a new service in the new system. FIG. 3 is a conceptual diagram illustrating the service providing areas in which some of the carriers are reallocated to the new system. As illustrated in FIG. 3, due to the nature of the mobile communication systems where mobile terminals that receive the services change their locations, in some of the target areas, there is no mobile terminal that receives the service at a certain time despite the fact that the telecommunications companies are providing the services.

That is, as illustrated in FIG. 3, the carriers C and D are reallocated to the new system in an area A2; however, there is no mobile terminal that receives the service in the area A2, indicating that no communication is performed in the area A2. With this condition, if numerous users desire to have access to the services provided via the existing system in the area A2, the not currently utilized carriers C and D may further be reallocated to the existing system, thereby providing the services via the existing system. When the telecommunications company deploys the new system in the service providing area, there may be numerous mobile terminals utilizing the existing system while few mobile terminals utilizing the new system may exist in the service providing area. This may be easily expected from a situation where there are few subscribers to the new service utilizing the new system immediately after the launch of the new service.

SUMMARY

According to an aspect of the embodiment, there is provided a communication system for performing communication between a first mobile terminal in a first mobile communication system and a second mobile terminal in a second mobile communication system in a communication area by allocating different carriers to the first and second mobile communication systems. The communication system includes a shared radio processing apparatus shared by the first and second mobile communication systems and configured to carryout radio processing for the first and second mobile communication systems in the communication area. In the communication system, the shared radio processing apparatus includes a measuring unit configured to measure power of each of the carriers; a carrier usage determination unit configured to determine a frequency of carrier usage of each of the carriers based on a measured value of the corresponding carrier measured by the measuring unit; a carrier status determination unit to determine, as a carrier status of the carriers, whether the carriers are allocatable to one of the first and second mobile communication systems based on the frequency of the carrier usage thereof determined by the carrier usage determination unit; and a reporting unit configured to transmit a carrier status report including the carrier status of the carriers determined by the carrier status determination unit to the first and second mobile communication systems.

The object and advantages of the invention will be realized and attained by means of the elements and combinations particularly pointed out in the appended claims. It is to be understood that both the foregoing general description and the following detailed description are exemplary and explanatory and are not restrictive of the invention, as claimed.

DESCRIPTION OF EMBODIMENTS

A description is given, with reference to the accompanying drawings, of embodiments of the present invention.

Communication System Configuration

Figure 4:
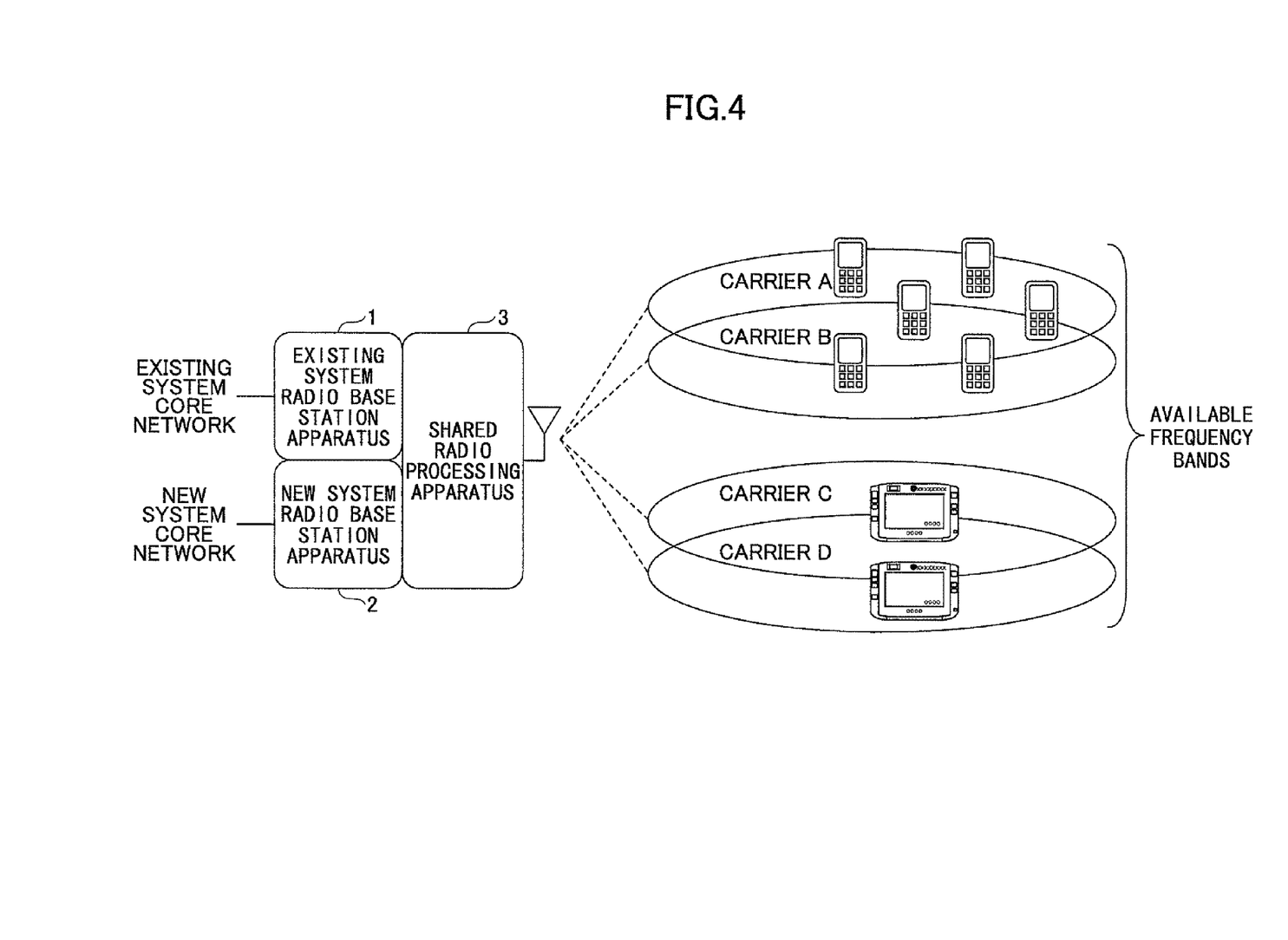
FIG. 4 is a configuration diagram illustrating a communication system according to a first embodiment.

FIG. 4 is a configuration diagram of a communication system according to an embodiment. In the communication system, one or more carriers are assigned to each of communication areas for an existing mobile communication system and a new mobile communication system. As illustrated in FIG. 4, the communication system includes an existing system radio base station apparatus 1, a new system radio base station apparatus 2, and a shared radio processing apparatus 3 provided as radio equipment (Radio Equipment RE) of the existing system radio base station apparatus 1 and the new system radio base station apparatus 2. With this configuration, the communication area for the new system may be rapidly increased while lowering the construction cost.

First Embodiment

Figure 5:
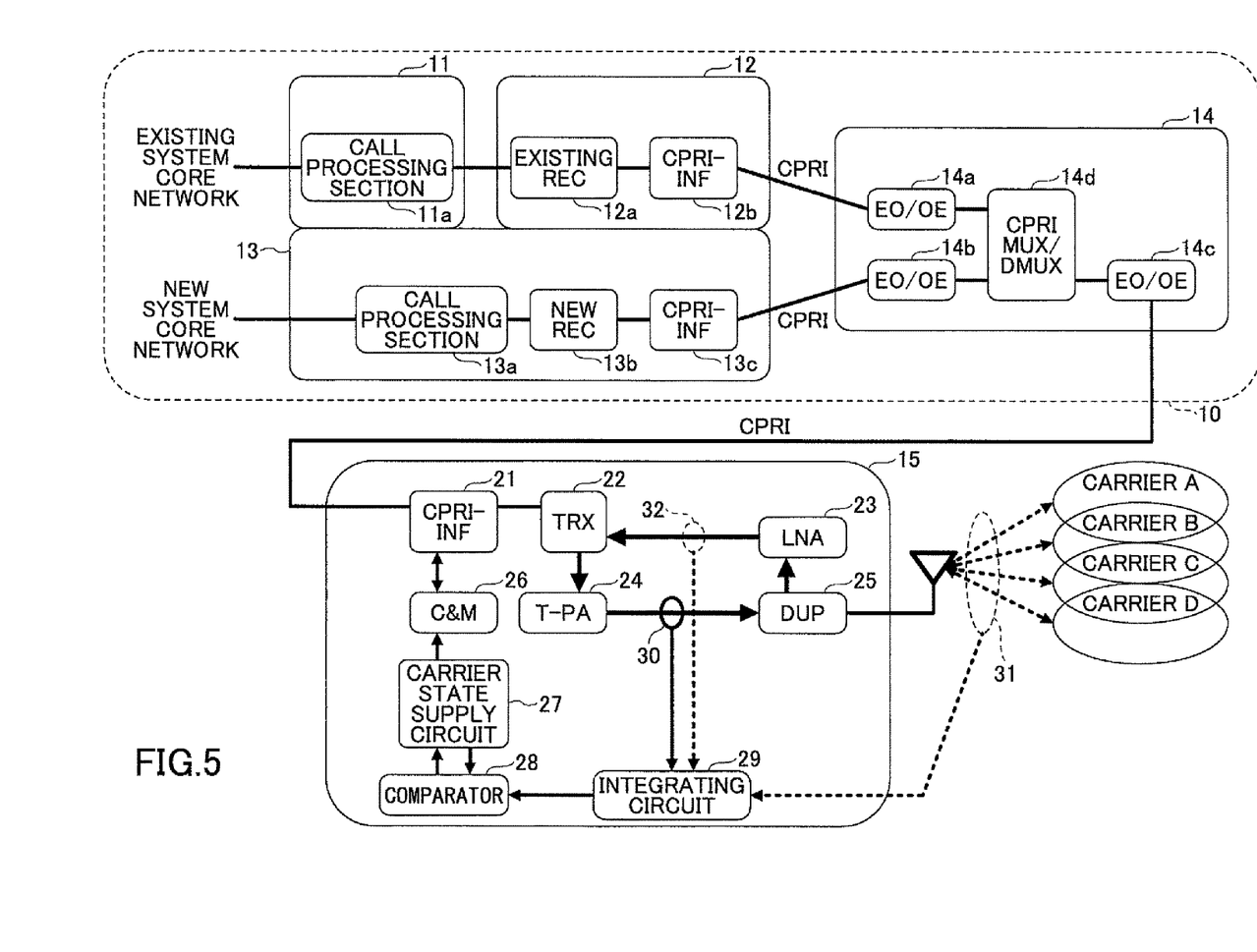
FIG. 5 is a configuration diagram illustrating a radio base station according to a first embodiment formulating communication areas for an existing system and a new system.

FIG. 5 is a configuration diagram illustrating a radio base station according to a first embodiment formulating communication areas for an existing system and a new system. As illustrated in FIG. 5, a telecommunications station building 10 includes an existing system base station control apparatus 11, an existing system radio base station apparatus 12, a new system radio base station apparatus 13, and a CPRI (Common Public Radio Interface) multiplexer 14. Note that the existing system base station control apparatus 11 and the existing system radio base station apparatus 12 in FIG. 5 correspond to the existing system radio base station apparatus 1 in FIG. 4, the new system radio base station apparatus 13 corresponds to the new system radio base station apparatus 2 in FIG. 4, and a later-described shared radio processing apparatus 15 in FIG. 5 corresponds to the shared radio processing apparatus 3 in FIG. 4. Note that if the existing system is WCDMA, and the new system is LTE, the existing system base station control apparatus 11 corresponds to a radio network controller (RNC), the existing system radio base station apparatus 12 corresponds to abase station (BS), and the new system radio base station apparatus 13 corresponds to an evolved Node-B (eNodeB).

The existing system base station control apparatus 11 is connected to an existing core network and includes a call processing section 11a. The existing system radio base station apparatus 12 includes an existing radio equipment controller (existing REC) 12a utilized as a controller section of the radio base station, and a common public radio interface-interface (CPRI-INF) 12b that is a standard interface for transmitting via optical fibers synchronization information between the existing REC and the RE (Radio Equipment), control or management information, and base band signals of users plain data.

The new system radio base station apparatus 13 is connected to a new system core network and includes a call processing section 13a, a new radio equipment controller (new REC) 13b utilized as a controller section of the radio base station, and a common public radio interface-interface (CPRI-INF) 13c that is a standard interface for transmitting synchronization information between the new REC and the RE (Radio Equipment).

The call processing sections 11a and 13a are, while connecting to the mobile terminals, configured to monitor available wired channel resources, wireless channel resources, and processing capabilities of the corresponding systems, determine resources to be assigned to each call, and carry out call processing steps to establish connections. The physical arrangement of the call processing section may differ based on the communication system and the system configuration to be used. In the existing system, the call processing section 11a is arranged in the base station control apparatus 11 that is a higher-level apparatus of the radio base station apparatus 12, whereas in the new system, the call processing section 13a is arranged in the radio base station apparatus 13.

The CPRI multiplexer 14 includes EO/OE converters 14a, 14b, and 14c configured to carry out conversion between optical signals and electric signals, and a CPRI MUX/DMUX 14d configured to multiplex plural CPRI signals into a common output or demultiplex an input into separate CPRI signals. The EO/OE converters 14a, 14b, and 14c are connected via optical fibers to a CPRI-INF 12b of the existing system radio base station apparatus 12, a CPRI-INF 13c of the new system radio base station apparatus 13 and a CPRI-INF 21 and the shared radio processing apparatus 15.

The shared radio processing apparatus 15 includes the CPRI-INF 21, a transmitter-receiver section 22, a low noise amplifier 23, a power amplifier 24, a duplexer section 25, a monitoring control section 26, a carrier status generating circuit 27, a comparator 28, and an integrating circuit 29. The CPRI-INF 21 is a standard interface between the RE, the existing REC and the new REC.

The transmitter-receiver section 22 abbreviated as "TRX" in FIG. 5 modulates a transmission base band signal supplied from the CPRI-INF 21 into a transmission RF radio frequency signal while A/D converting a received RF signal into a receiver base band signal and supplying the converted receiver base band signal to the CPRI-INF 21. The low noise amplifier 23 abbreviated as "LNA" in FIG. 5 amplifies the received RF signal.

The power amplifier 24 abbreviated as "T-PA" in FIG. 5 amplifies the transmission RF signal supplied from the transmitter-receiver section 22 to a prescribed level. The duplexer section 25 abbreviated as "DUP" in FIG. 5 keeps the transmission RF signal and the received RF signal separated to filter out extraneous frequency components.

The monitoring control section 26 indicated as "C&M" (i.e., control and maintenance) in FIG. 5 monitors and controls sections of the shared radio processing apparatus 15 to report the carrier statuses detected by its monitoring function as CPRI control or management information to the call processing sections 11a and 13a of the higher-level apparatuses (i.e., the existing system base station control apparatus 11 and the new system radio base station apparatus 13).

A probe 30 measures respective radio outputs of the carriers A to D utilized in the target communication area. The probe 30 is configured to measure fluctuation of the radio output power for each carrier in the shared radio processing apparatus 15. In addition to the probe 30, there may be added a probe 31 configured to directly measure the output power of an antenna for each carrier outside the shared radio processing apparatus 15, and a probe 32 configured to measure received power for each carrier inside the shared radio processing apparatus 15 (see FIG. 5).

The integrating circuit 29, for example, includes a sufficiently long time constant of approximately several sec to several min for the several msec cycle fluctuation of radio output power or received power supplied from the probe 30, 31, or 32 such that the integrating circuit 29 computes time integration of the radio output power or received power. The integral value obtained by the integrating circuit 29 indicates that the power measured by the probe exhibits a high level while a carrier is transmitting or receiving significant signals, and a low level while the carrier is not transmitting or receiving the significant signals.

The comparator 28 compares the integral value of the carrier output from the integrating circuit 29 with an internally held threshold previously set in the comparator 28 to determine the carrier usage (i.e., carrier availability), and supplies the determined result to the carrier status generating circuit 27. Note that alternatively, the comparator 28 may be configured to compare the integral values between the carriers.

The carrier status generating circuit 27 determines the carrier status, indicating which of the existing system and the new system utilizes the carrier, based on the determined result of the carrier usage supplied from the comparator 28. The carrier status generating circuit 27 then supplies the determined carrier status to the monitoring control section 26. For example, if the carrier status generating circuit 27 determines that the carrier A is available in the existing system radio base station apparatus 12, the carrier A is not available in the new system radio base station apparatus 13.

The monitoring control section 26 transmits control or management information for the carrier status change to the call processing sections 11a and 13a configured to manage the resources allocation in existing system radio base station apparatus 12 and the new system radio base station apparatus 13 when one of the carrier statuses supplied from the carrier status generating circuit 27 is changed.

Note that the functions of the carrier status generating circuit 27, the comparator 28, and the integrating circuit 29 may be realized by adding new circuits or software components of these functions operable in an already installed processor.

In general, the call processing sections 11a and 13a do not allocate unavailable resources due to breakdown or failure for connecting new mobile terminals. The call processing sections 11a and 13a monitor statuses of other apparatuses such as the radio processing section or the carrier statuses at predetermined intervals and store the monitored statuses. Further, the call processing sections 11a and 13a also monitor statuses of the various resources while connected to the mobile terminals.

Operation of First Embodiment

In the configuration illustrated in FIG. 5, the existing call processing section 11a and the new system call processing section 13a each monitor the statuses of the carriers A, B, C, and D, and start operating when they acknowledge that the carriers A, B, C, and D are available. The carrier status generating circuit 27 in the shared radio processing apparatus 15 allocates the carriers C and D to the existing system radio base station apparatus 12 and the carriers A and B to the new system radio base station apparatus 13, and initiates the operation based on such initial allocation statuses of the carriers A, B, C, and D. The initial allocation statuses of the carriers A, B, C, and D are also supplied to the comparator 28.

When the existing system radio base station apparatus 12 and the new system radio base station apparatus 13 start up and establish connections between the circuits within the respective radio base station apparatuses 12 and 13, the carrier status generating circuit 27 in the shared radio processing apparatus 15 supplies the carrier statuses to the monitoring control section 26. Note that the carrier statuses supplied to the monitoring control section 26 differ between the existing system and the new system. That is, since the carriers C and D are allocated to the existing system radio base station apparatus 12, the carrier statuses supplied to the monitoring control section 26 include information indicating that services via the carriers A and B are not available in the existing system radio base station apparatus 12. Likewise, since the carriers A and B are allocated to the new system radio base station apparatus 13, the carrier statuses supplied to the monitoring control section 26 include information indicating that services via the carriers C and D are not available in the new system radio base station apparatus 13.

The monitoring control section 26 appropriately reports the carrier statuses differing in the existing system and the new system to the call processing sections 11a and 13a. Such carrier status reports are transmitted as the control or management information in the CPRI format from the shared radio processing apparatus 15 to the existing REC 12a and the new REC 13b. The carrier status reports received by the existing REC 12a and the new REC 13b are then transmitted to the respective call processing sections 11a and 13a via optionally provided interfaces. Thus, the call processing sections 11a and 13a detect the carrier statuses based on the carrier status reports, indicating that some of the carriers utilized for connecting to the communication area are available and the others are not available in the corresponding radio base station apparatuses.

When the mobile terminal establishes call connection, the call processing sections 11a and 13a in the respective systems allocate radio resources of the available carriers to the call connection without allowing the allocation of the unavailable carriers. With such operations, the radio resources are appropriately allocated to the respective systems after the operation of the radio base station is started.

The operation of the radio base station is started in the status described above. The radio output power output from each carrier is measured by the probe 30 and integrated by the integrating circuit 29 while the radio base station is in operation. Note that PwrInt(A) to PwrInt(D) represent respective outputs of the integrating circuit 29 for the carriers A to D.

The comparator 28 includes predetermined thresholds initially set as a determination condition to determine whether the frequency of carrier usage is high or low. The threshold to determine whether the frequency of carrier usage is high or low may be set differently for each of the two systems; for example, the frequency of carrier usage may be represented by Trd_High and Trd_Low in the existing system and the frequency of carrier usage may be represented by New_High and New_Low in the new system. The values of the Trd_High and New_High may be approximately 80 to 90%, and those of the Trd_Low and New_Low may be approximately several to 20%. The comparator 28 compares the values of the PwrInt(A) to PwrInt(D) with the thresholds of the respective systems to which corresponding carriers are allocated and determines the frequency of carrier usage of each carrier based on the comparison result.

For example, in the above configuration, since the carrier A is allocated to the new system, the comparator 28 compares the value of the PwrInt(A) with New_High and with New_Low and reports the comparison results to the carrier status generating circuit 27. For example, if the comparison results indicate PwrInt(A)<New_Low, PwrInt(B)<New_Low, PwrInt(C)>Trd_High, and PwrInt(D)<Trd_High, the comparator 28 determines that the frequency of carrier usage in the existing system is high and the frequency of carrier usage in the new system is low.

The carrier status generating circuit 27 updates the carrier statuses, which are reported to the respective systems at the initial operation, with new carrier statuses obtained based on the comparison results reported from the comparator 28. For example, if the frequency of carrier usage in the existing system is high and the frequency of carrier usage in the new system is low, the carrier status generating circuit 27 transmits to the new system side the new carrier status indicating that the carrier B is not available, and transmits to the existing system side the new carrier status indicating that the carrier B is available. Accordingly, the carrier B allocated to the new system is reallocated to the existing system, thereby equalizing the frequency of carrier usage.

Figure 6:
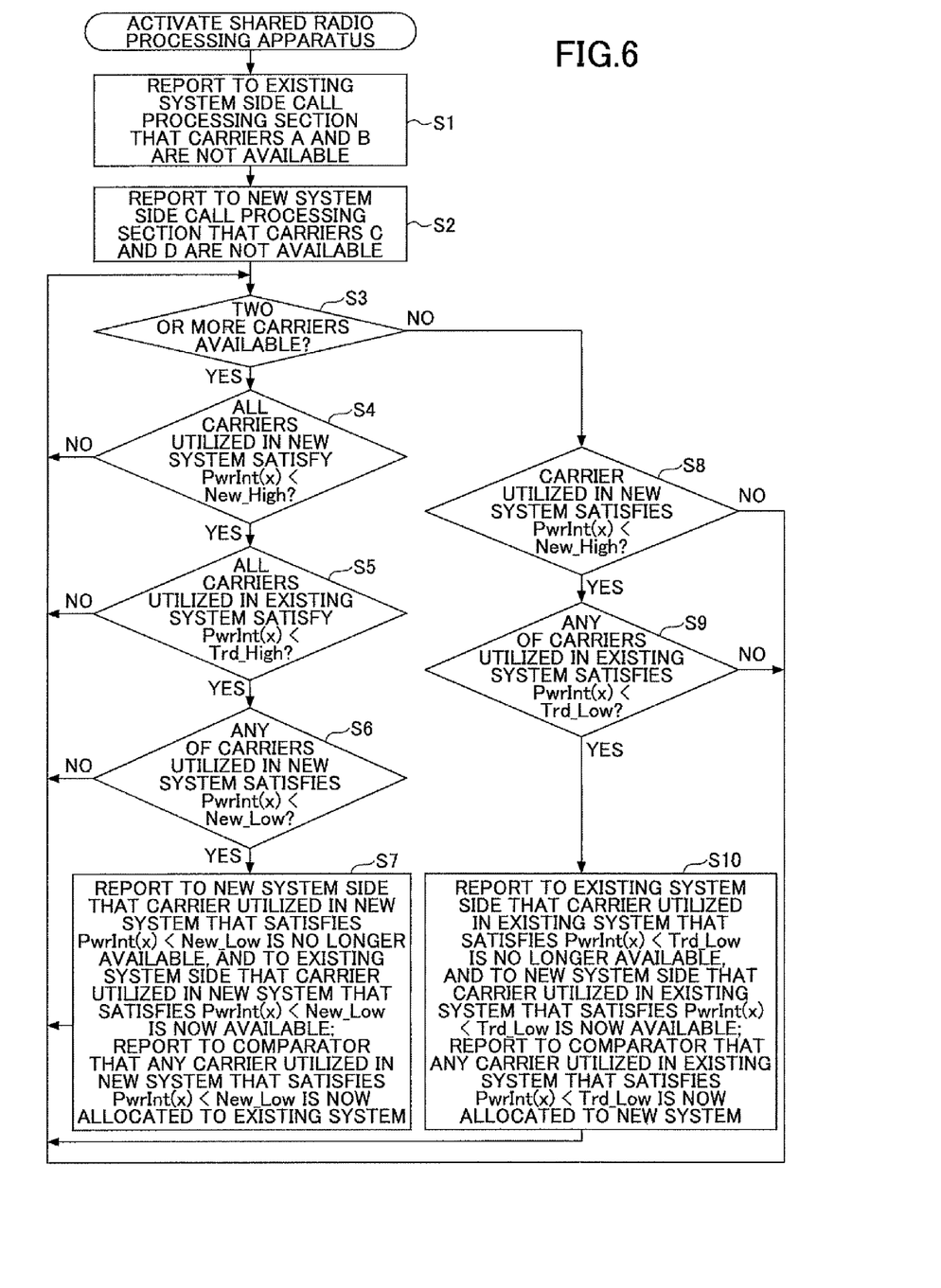
FIG. 6 is a flow chart illustrating processing including steps executed by a carrier status generating circuit.

Note that specific processes of reporting the carrier statuses carried out by the carrier status generating circuit 27 may vary with the operational policy of the telecommunications company that provides services or configurations of apparatuses/communication areas. FIG. 6 is a flowchart illustrating processing including steps executed by the carrier status generating circuit 27.

Note that in FIG. 6, a new service with the new system is recently introduced. Although the number of new system users is increasing, currently, a large majority of users of the telecommunications company use the services provided in the existing system. Accordingly, the carrier status generating circuit 27 determines that there is no need for allocating to the new system the amount of radio resources that exceeds the amount allocated to the existing system, because the number of the new system users is small. Further, in FIG. 6, since the mobile terminal is moving, at least one carrier is constantly available in each of the systems.

As illustrated in FIG. 6, in step S1, the carrier status generating circuit 27 reports to the existing system base station control apparatus 11 that the carriers A and B are not available (not usable), and in step S2, the carrier status generating circuit 27 reports to the new system radio base station apparatus 13 that the carriers C and D are not available, as initial statuses of the carriers A to D. That is, in FIG. 6, the services via the new system are currently provided by allocating the carriers A and B to the new system, and the services via the existing system are currently provide by allocating the carriers C and D to the existing system in this communication area.

Subsequently, in step S3, the carrier status generating circuit 27 determines whether two or more carriers (i.e., carriers A and B) are utilized in the new system side. Since two carriers (carriers A and B) are utilized in the new system side, the determination result is YES in step S3. Note that in the determination condition, the number of carrier allocations may be reduced if YES is determined in the first determination step, and hence at least one carrier is constantly allocated to the new system.

Subsequently, in step S4, the carrier status generating circuit 27 determines whether the carriers A and B utilized in the new system side both satisfy the conditions PwrInt(A)<New_High and PwrInt(B)<New_High. Note that "x" of PwrInt (x) in FIG. 6 represents one of the carriers A, B, C, and D. If the determination result in step S4 is NO, the carrier status generating circuit 27 determines that the frequency of carrier usage in the new system is high and returns to a process in step S3 without reducing the number of carrier allocations in the new system in the later steps.

If the determination result in step S4 is YES, the carrier status generating circuit 27 determines whether the carriers C and D utilized in the existing system side both satisfy the conditions PwrInt(C)<Trd_High and PwrInt(D)<Trd_High in step S5. If the determination result in step S5 is NO, the carrier status generating circuit 27 determines that the carriers C and D utilized in the existing system side include sufficient capacities and returns to the process in step S3.

If the determination result in step S5 is YES, the carrier status generating circuit 27 determines whether the carriers A and B utilized in the new system side satisfy anyone of the conditions PwrInt(A)<New_Low and PwrInt(B)<New_Low in step S6. If the determination result in step S6 is NO, the carrier status generating circuit 27 determines that the frequency of carrier usage of the carriers A and B in the new system are both high to some extent and returns to the process in step S3 without reducing the number of carrier allocations in the new system.

If the determination result in step S6 is YES and the carrier B utilized in the new system side satisfies the condition PwrInt(B)<New_Low, the carrier status generating circuit 27 changes respective carrier statuses output to the new system and the existing system in step S7. Specifically, the carrier status generating circuit 27 reports to the new system radio base station apparatus 13 that the carrier B allocated to the new system is no longer available for use in the services in the new system, and to the existing system base station control apparatus 11 that the carrier B is now available for use in the services in the existing system. In addition, the carrier status generating circuit 27 reports to the comparator 28 that the carrier B is now allocated to the existing system. Thus, the comparator 28 changes the targets for comparison with PwrInt(B) from the values of New_High and New_Low to those of Trd_High and Trd_Low (step S7).

Meanwhile, if only one carrier (i.e., carrier A) is allocated to the new system and the determination result in step S3 is NO, the carrier status generating circuit 27 determines whether the carrier allocated to the existing system is available for use in the new system, which is illustrated in the route on the right hand side of the flowchart in FIG. 6. Specifically, the carrier status generating circuit 27 determines whether the carrier A utilized in the new system satisfies the condition PwrInt(A)<New_High in step S8. If the determination result in step S8 is NO, the carrier status generating circuit 27 determines that the carrier A utilized in the existing system side includes a sufficient capacity and returns to the process in step S3.

If the carrier A utilized in the new system satisfies the condition PwrInt(A)<New_High in step S8, the carrier status generating circuit 27 determines whether each of the carriers allocated to the existing system (i.e., carriers B, C, and D) satisfies a corresponding one of the conditions PwrInt(B)<Trd_Low, PwrInt(C)<Trd_Low, and PwrInt(D)<Trd_Low, and then determines whether two or more of the carriers satisfy the corresponding conditions in step S9. If the determination result in step S9 is NO, the carrier status generating circuit 27 determines that the frequency of carrier usage in the new system side is high whereas the frequency of carrier usage in the existing system side is sufficiently low and returns to the process in step S3.

If the determination result in step S9 is YES, and if the carriers C and D satisfy the respective conditions, the carrier status generating circuit 27 reports to the existing system base station control apparatus 11 that the carrier D is not available (not usable) for use in the services in the existing system, and the carrier status generating circuit 27 reports to the new system radio base station apparatus 13 that the carrier D is now available for use in the services in the new system in step S10. In addition, the carrier status generating circuit 27 reports to the comparator 28 that the carrier D is now allocated to the new system. Thus, the comparator 28 changes the targets for comparison with PwrInt(D) from the values of Trd_High and Trd_Low to those of New_High and New_Low (step S10).

Accordingly, the carrier status generating circuit 27 outputs updated carrier statuses for the new system and the existing system to the monitoring control system 26 in the above-described manner. The monitoring control section 26 appropriately reports the updated carrier statuses for the existing system and the new system as the control or management information in CPRI format to the call processing sections 11a and 13a in the respective systems.

Note that if failure or breakdown occurs in any of the circuits actually transmitting or receiving carriers, such report is transmitted to a monitoring device of the telecommunications company. Thus, a maintenance worker of the company may repair the circuit subject to maintenance such as circuit replacement based on the report. However, if the report indicating that the carrier is no longer available as described above is transmitted, no failure or breakdown has occurred in the circuits and thus no maintenance work such as circuit replacement may be required.

Accordingly, it is preferable that the monitoring control section 26 send carrier status reports to the respective systems as the control or management information in CPRI format by assigning different error codes; one to a carrier status report indicating the actual failure or breakdown in the circuitry and the other to the carrier status report indicating the change in the radio system resources allocation to identify the difference between the two carrier status reports.

The carrier statuses utilized for connection in the communication areas acknowledged by the existing system call processing section 11*a* and the new system call processing section 13*a* are thus updated in the above described manner. Since the call processing sections 11*a* and 13*a* determine radio resources allocations to the moving mobile terminals by selecting carriers utilized for the services, the radio resources allocations may be dynamically changed.

Note that in the first embodiment, the probe 30, 31 or 32 is used as an example of a measuring unit to measure radio outputs of the carriers, the comparator 28 and the integrating circuit 29 are used as an example of a carrier usage determination unit to determine the frequency of the carrier usage, the carrier status generating circuit 27 is used as an example of a carrier status determination unit to determine a carrier status, and the monitoring control section 26 is used as an example of a reporting unit to transmit a carrier status report.

Second Embodiment

In the first embodiment, the less utilized carriers allocated to one system detected by the shared radio processing apparatus 15 are dynamically reallocated to the other system, based on the carrier status report such as failure or breakdown of the circuitry.

In the first embodiment, the frequency of carrier usage is obtained based on the output power of the target carrier to figure out the trigger to transmit the carrier status report. Although the frequency of carrier usage is determined to some extent, it may be difficult to determine whether there is no user who utilizes the target carrier.

If there are some remaining users communicating via the carrier subject to system reallocation change and that carrier is suddenly cut off from the users, the users are suddenly cut off from the communication to receive the services provided via the carrier subject to system allocation change. Therefore, the users may perceive the cutoff as degradation of the service quality. If there are some remaining users communicating via the carrier subject to system reallocation and a new system start communicating utilizing the same carrier, the communications may fail in both systems.

Currently, almost all the mobile communication systems provide a handover function. The handover function supports the mobility of the mobile terminal to switch over a first base station to a second base station when the mobile terminal in a communication area supported by the first base station moves into a communication area supported by the second base station. Further, the handover function supports changeover between the different carriers in the same base station, in addition to the changeover between the different base stations.

Next, operations of the handover function are described. When the mobile terminal in communication detects the degradation of communication quality of the carrier, the mobile terminal searches for another carrier having better communication quality. When the mobile terminal detects a carrier having sufficiently high communication quality for the handover, the mobile terminal reports to the system connected by the mobile terminal that there is a carrier having communication quality of a predetermined value or more, and the system that has received the report carries out a handover process based on the reception of the report as a trigger. In the second embodiment, the users of the carrier subject to system reallocation may be shifted to another carrier by utilizing the handover function.

Figure 7:
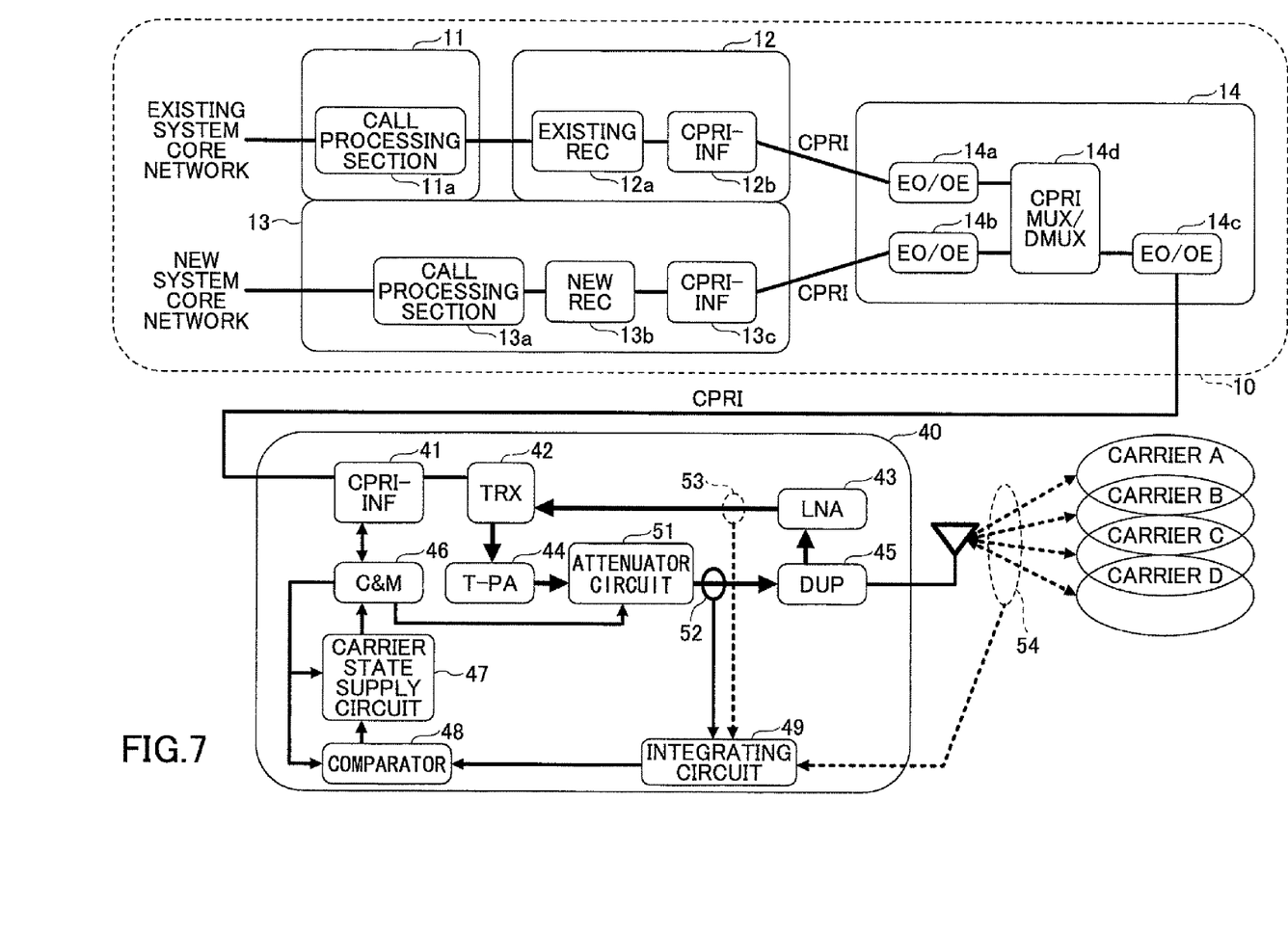
FIG. 7 is a configuration diagram illustrating a radio base station according to a second embodiment formulating communication areas for an existing system and a new system.

FIG. 7 is a configuration diagram illustrating a radio base station according to a second embodiment formulating communication areas for an existing system and a new system. Components illustrated in FIG. 7 similar to those illustrated in FIG. 5 are provided with the same reference numerals. As illustrated in FIG. 7, a telecommunications station building 10 includes an existing system base station control apparatus 11, an existing system radio base station apparatus 12, a new system radio base station apparatus 13, and a CPRI (Common Public Radio Interface) multiplexer 14. Note that the existing system base station control apparatus 11 and the existing system radio base station apparatus 12 in FIG. 7 correspond to the existing system radio base station apparatus 1 in FIG. 4, the new system radio base station apparatus 13 corresponds to the new system radio base station apparatus 2 in FIG. 4, and a later-described shared radio processing apparatus 40 in FIG. 7 corresponds to the shared radio processing apparatus 3 in FIG. 4. Note that if the existing system is WCDMA, and the new system is LTE, the existing system base station control apparatus 11 corresponds to a radio network controller (RNC), the existing system radio base station apparatus 12 corresponds to a base station (BS), and the new system radio base station apparatus 13 corresponds to an evolved Node-B (eNodeB).

The existing system base station control apparatus 11 is connected to an existing core network and includes a call processing section 11*a*. The existing system radio base station apparatus 12 includes an existing radio equipment controller (existing REC) 12*a* utilized as a controller section of the radio base station, and a common public radio interface-interface (CPRI-INF) 12*b* that is a standard interface for transmitting via optical fibers synchronization information between the existing REC and the RE (Radio Equipment), control or management information, and users plain data. The new system radio base station apparatus 13 is connected to anew system core network and includes a call processing section 13*a*, a new radio equipment controller (new REC) 13*b* utilized as a controller section of the radio base station, and a common public radio interface-interface (CPRI-INF) 13*c* that is a standard interface between the new REC and the RE (Radio Equipment).

Note that the call processing sections 11*a* and 13*a* are, while connecting to the mobile terminals, configured to monitor available wired channel resources, wireless channel resources, and processing capabilities of the corresponding systems, determine resources to be assigned to each call, and carryout call processing steps to establish connections. The physical arrangement of the call processing section may differ based on the communication system and the system configuration to be used. In the existing system, the call processing section 11*a* is arranged in the base station control apparatus 11 that is a higher-level apparatus of the radio base station apparatus 12, whereas in the new system, the call processing section 13*a* is arranged in the radio base station apparatus 13.

The CPRI multiplexer 14 includes EO/OE converters 14*a*, 14*b*, and 14*c* configured to carryout conversion between optical signals and electric signals, and a CPRI MUX/DMUX 14*d* configured to multiplex plural CPRI signals into a common output or demultiplex an input into separate CPRI signals. The EO/OE converters 14*a*, 14*b*, and 14*c* are connected via optical fibers to a CPRI-INF 12b of the existing system radio base station apparatus 12, a CPRI-INF 13c of the new system radio base station apparatus 13 and a CPRI-INF 41 of the shared radio processing apparatus 40.

The shared radio processing apparatus 40 includes the CPRI-INF 41, a transmitter-receiver section 42, a low noise amplifier 43, a power amplifier 44, a duplexer section 45, a monitoring control section 46, a carrier status generating circuit 47, a comparator 48, an integrating circuit 49, and an attenuator circuit 51.

The transmitter-receiver section 42 demodulates a transmission base band signal supplied from the CPRI-INF 41 into a transmitter RF radio frequency signal while A/D converting a received RF signal into a receiving base band signal and supplying the converted receiving base band signal to the CPRI-INF 41. The low noise amplifier 43 amplifies the received RF signal.

The power amplifier 44 amplifies the transmission RF signal supplied from the transmitter-receiver section 42 to a prescribed level. The attenuator circuit 51 lowers the radio output power for each of the carriers A to D. The monitoring control section 46 controls the amount of the radio output power to be reduced for each carrier. The attenuator circuit 51 may be newly added, or may utilize an existing function to control the radio output if there is such a function already provided.

The duplexer section 45 separately switches the transmission RF signal and the received RF signal to filter out extraneous frequency components. The monitoring control section 46 (i.e., "C & M" in FIG. 7) monitors and controls sections of the shared radio processing apparatus 40 to report the carrier statuses detected by its monitoring function as CPRI control or management information to the call processing sections 11a and 13a of the higher-level apparatuses (i.e., the existing system base station control apparatus 11 and existing system radio base station apparatus 12), while supplying the control information to the carrier status generating circuit 47, the comparator 48 and the attenuator circuit 51.

A probe 52 measures respective radio outputs of the carriers A to D utilized in the target communication area. The probe 52 is configured to measure fluctuation of the radio output power for each carrier in the shared radio processing apparatus 40. In addition to probe 52, there may be added a probe 53 configured to directly measure the output power of an antenna for each carrier outside the shared radio processing apparatus 40, and a probe 54 configured to measure received power for each carrier inside the shared radio processing apparatus 40 (see FIG. 7).

The integrating circuit 49, for example, includes a sufficiently long time constant for the fluctuation of radio output power or received power supplied from the probe 52, 53, or 54 such that the integrating circuit 49 computes time integration of the radio output power or received power. The integral value obtained by the integrating circuit 49 indicates that the power measured by the probe exhibits a high level while a carrier is transmitting or receiving significant signals, and a low level while the carrier is not transmitting or receiving the significant signals.

The comparator 48 compares the integral value of each carrier output from the integrating circuit 49 with the internally held threshold to determine the carrier usage, and supplies the determined result to the carrier status generating circuit 47. Note that alternatively, the comparator 48 may be configured to compare the integral values between the carriers.

The carrier status generating circuit 47 determines the carrier status, indicating which of the existing system and the new system utilizes by the carrier, based on the determined result of the carrier usage supplied from the comparator 48. The carrier status generating circuit 47 then supplies the determined carrier status to the monitoring control section 46. For example, if the carrier status generating circuit 47 determines that the carrier A is available in the existing system radio base station apparatus 12, the carrier A is not available in the new system radio base station apparatus 13.

The monitoring control section 46 transmits control or management information for the carrier status change to the call processing sections 11a and 13a configured to manage the resources allocation in existing system radio base station apparatus 12 and the new system radio base station apparatus 13 when one of the carrier statuses supplied from the carrier status generating circuit 47 is changed.

Operation of Second Embodiment

Figure 8:
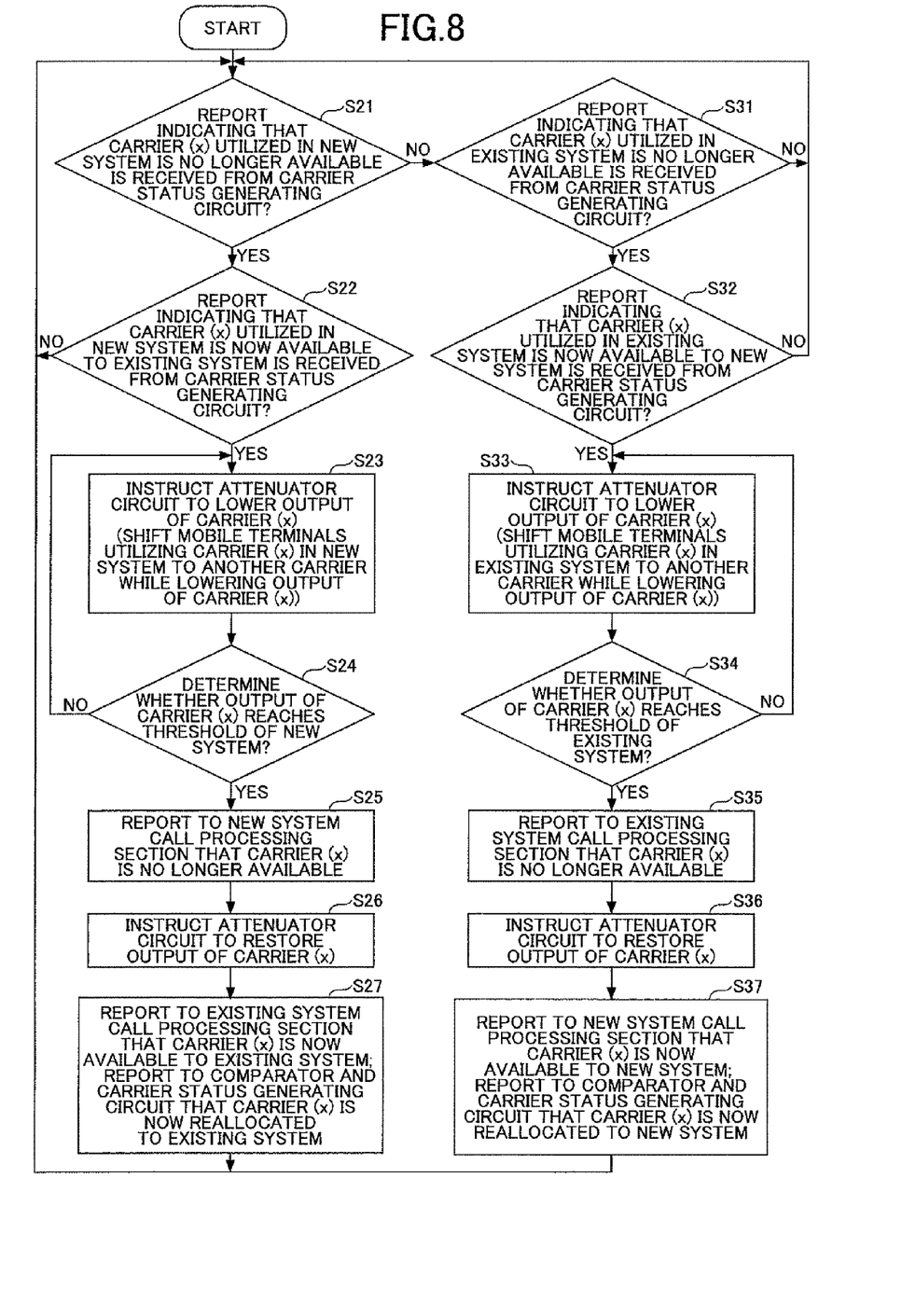
FIG. 8 is a flow chart illustrating processing including steps executed by a monitoring control section (C & M)

FIG. 8 is a flowchart illustrating processing including steps executed by the monitoring control section 46 (i.e., "C & M") in FIG. 7. In this processing, the users of the carrier subject to system reallocation may be shifted to another carrier by utilizing the handover function. Similar to the initial status of the first embodiment, the carriers A and B are allocated to the new system, while the carriers C and D are allocated to the existing system. Note that in this initial status, the attenuator circuit 51 has not lowered the radio output power.

Similar to the processing of the first embodiment, when a decrease in a communication amount is detected in the new system while an increase in a communication amount is detected in the existing system, the monitoring control section 46 determines whether it has received from the carrier status generating circuit 47 a report indicating that the carrier B (or carrier A) is no longer available to the new system or a report indicating that the carrier B (or carrier A) is now available to the existing system (step S21 and S22).

If the determination results insteps S21 and S22 are both YES, the monitoring control section 46 controls the attenuator circuit 51 to lower the output of the carrier B subject to reallocation for a predetermined period in step S23 without transmitting the carrier change report to the call processing sections 11a and 13a of the corresponding systems. The mobile terminal utilizing the carrier B in the new system detects the degradation of the communication quality as the output of the carrier B is lowered. When the mobile terminal detects the degradation of communication quality of the carrier B, the mobile terminal utilizing the carrier B in the new system searches for another carrier having better communication quality. Since the services utilizing the carrier A is provided in the same communication area, the monitoring control section 46 may detect the carrier A as a carrier having a sufficiently high communication quality. However, the monitoring control section 46 may detect a carrier in an adjacent communication area as the carrier having a high communication quality. If the monitoring control section 46 detects the carrier in the adjacent communication area as the carrier having a high communication quality, a handover destination is the adjacent communication area. The mobile terminal in the new system that has detected the carrier having the high communication quality transmits a report on the handover destination to the new system, and the handover is carried out by following the ordinary processing of the new system.

The monitoring control section 46 continuously controls the attenuator circuit 51 to continuously lower the output of the carrier B. Then, the monitoring control section 46 determines whether the output of the carrier B is a predetermined threshold or less in step S24. When the output of the carrier B is the predetermined threshold or less, the monitoring control section 46 reports to the new system call processing section 13a that the carrier B is no longer available by utilizing the control or management information in the CPRI format in step S25.

After reporting the carrier status (of the carrier B) to the new system call processing section 13a, the monitoring control section 46 controls the attenuator circuit 51 to cancel the lowering of the output of the carrier B in step S26. The monitoring control section 26 reports to the existing system call processing section 11a that the carrier B is now available to the existing system in step S27. In addition, the monitoring control section 26 simultaneously reports to the comparator 48 that the carrier B allocated to the new system is now reallocated to the existing system.

Meanwhile, if the monitoring control section 46 does not receive from the carrier status generating circuit 47 a report indicating that the carrier B is no longer available to the new system in step S21, the monitoring control section 46 determines whether it has received from the carrier status generating circuit 47 a report indicating that the carrier D (or carrier C) is no longer available to the existing system or a report indicating that the carrier D (or carrier C) is now available to the new system (step S31 and S32).

If the determination results in steps S11 and S32 are both YES, the monitoring control section 46 controls the attenuator circuit 51 to lower the output of the carrier D subject to reallocation for a predetermined period in step S33 without transmitting the carrier change report to the call processing sections 11a and 13a of the corresponding systems. The mobile terminal utilizing the carrier B in the existing system detects the degradation of the communication quality as the output of the carrier D is lowered. When the mobile terminal detects the degradation of communication quality of the carrier D, the mobile terminal utilizing the carrier D in the existing system searches for another carrier having better communication quality. Since the services utilizing the carrier C is provided in the same communication area, the monitoring control section 46 may detect the carrier C as a carrier having a sufficiently high communication quality. However, the monitoring control section 46 may detect a carrier in an adjacent communication area as the carrier having a high communication quality. If the monitoring control section 46 detects the carrier in the adjacent communication area as the carrier having a high communication quality, a handover destination is the adjacent communication area. The mobile terminal in the existing system that has detected the carrier having the high communication quality transmits a report on the handover destination to the existing system, and the handover is carried out by following the ordinary processing of the existing system.

The monitoring control section 46 continuously controls the attenuator circuit 51 to continuously lower the output of the carrier D. Then, the monitoring control section 46 determines whether the output of the carrier D is a predetermined threshold or less in step S34. When the output of the carrier is the predetermined threshold or less, the monitoring control section 46 reports to the existing system call processing section 11a that the carrier D is no longer available by utilizing the control or management information in the CPRI format in step S35.

After reporting the carrier status (of the carrier D) to the existing system call processing section 11a, the monitoring control section 46 controls the attenuator circuit 51 to cancel the lowering of the output of the carrier D in step S36. The monitoring control section 46 reports to the new system call processing section 13a that the carrier D is now available to the new system in step S37. In addition, the monitoring control section 46 simultaneously reports to the comparator 48 that the carrier D allocated to the existing system is now reallocated to the new system.

Thus, the users utilizing the carrier subject to reallocation are shifted to another carrier by following the handover processing so that the radio resources may be dynamically reallocated without allowing the mobile terminals to detect the degradation of service quality.

Note that in the first embodiment, the probe 52, 53 or 54 is used as an example of a measuring unit to measure a radio output of the carrier, the comparator 48 and the integrating circuit 49 are used as an example of a carrier usage determination unit to determine the frequency of the carrier usage, the carrier status generating circuit 47 is used as an example of a carrier status determination unit to determine a carrier status, the monitoring control section 46 is used as an example of a reporting unit to transmit a carrier status report, and the attenuator circuit 51 is used as an example of an attenuator unit to reduce the amount of the output of the carrier.

Hardware Configuration of Shared Radio Processing Apparatus

Figure 9:
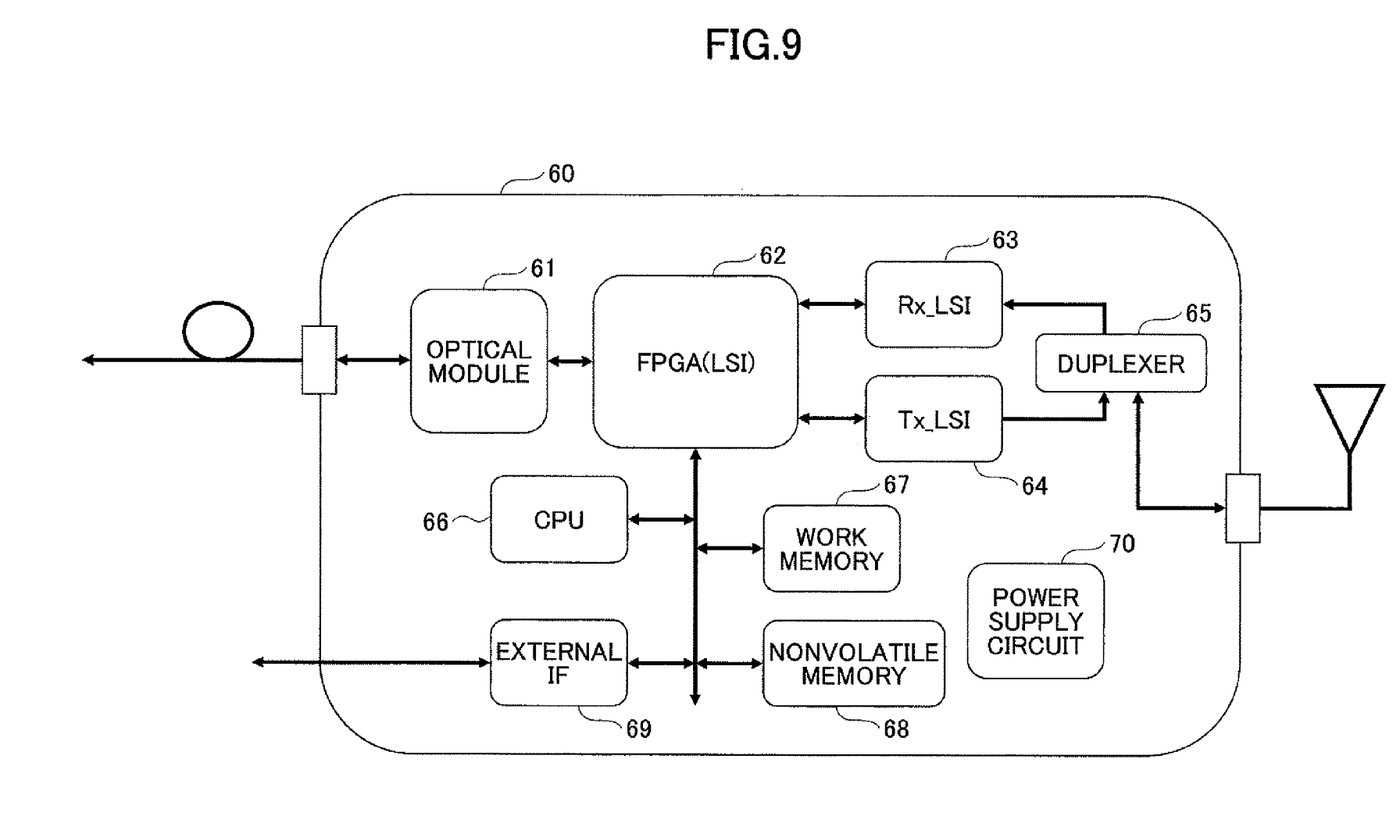
FIG. 9 is a hardware configuration diagram illustrating an example of a shared radio processing apparatus.

FIG. 9 is a hardware configuration diagram illustrating an example of the shared radio processing apparatuses 15 and 40. As illustrated in FIG. 9, a shared radio processing apparatus 60 includes an optical module 61, an FPGA (LSI) 62, an Rx_LSI 63, a Tx_LSI 64, a duplexer 65, a CPU 66, a work memory 67, a nonvolatile memory 68, an external interface (i.e., external IF) 69, and a power supply circuit 70.

Initially, a case where the carrier status generating circuits 27 and 47, the comparators 28 and 48, and the integrating circuits 29 and 49 are configured with software is described. The CPRI-INFs 21 and 41 are configured by the optical module 61 and the FPGA (LSI) 62. The transmitter-receiver sections 22 and 42 are configured by the FPGA (LSI) 62. The low noise amplifiers 23 and 43 are configured by the Rx_LSI 63. The power amplifiers 24 and 44 are configured by the Tx_LSI 64. The duplexer sections 25 and 45 are configured by the duplexer 65. The monitoring control sections 26 and 46 may be realized by deploying a computer program stored in the nonvolatile memory 68 in the work memory 68, and causing the CPU 66 to execute the deployed computer program to implement the functions of the monitoring control sections 26 and 46.

The carrier status generating circuits 27 and 47 may be realized by causing the CPU 66 to execute processing of determining the carrier usage status based on a processing result of the comparators 28 and 48. The comparators 28 and 48 may be realized by causing the CPU to execute processing of comparing the output of the integrating circuits 29 and 49 stored in the work memory 67 with the threshold stored in the nonvolatile memory 68. The integrating circuits 29 and 49 may be realized by causing the CPU 66 to periodically retrieve outputs of the probes, carry out integration on the retrieved outputs of the probes, and store the integration result in the work memory 67. The probes 30 and 52 may be realized based on a monitor signal of the Tx_LSI 64 and the logic in the FPGA (LSI) 62. The attenuator circuit 51 is realized by causing the CPU 66 to control attenuation based on the logic in the FPGA (LSI) 62.

Subsequently, a case where the carrier status generating circuits 27 and 47, the comparators 28 and 48, and the integrating circuits 29 and 49 are configured with hardware is described. The CPRI-INFs 21 and 41 are configured by the optical module 61 and the FPGA (LSI) 62. The transmitter-receiver sections 22 and 42 are configured by the FPGA (LSI) 62. The low noise amplifiers 23 and 43 are configured by the Rx_LSI 63. The power amplifiers 24 and 44 are configured by the Tx_LSI 64. The duplexer sections 25 and 45 are configured by the duplexer 65. The monitoring control sections 26 and 46 deploy a computer program stored in the nonvolatile memory 68 in the work memory 68, and cause the CPU 66 to execute the deployed computer program to implement the functions of the monitoring control sections 26 and 46.

The carrier status generating circuits 27 and 47 are configured to determine the carrier usage status based on a processing result of the comparators 28 and 48 based on the logic in the FPGA (LSI) 62. The comparators 28 and 48 are configured to compare the output of the integrating circuits 29 and 49 stored in the work memory 67 based on the logic in the FPGA (LSI) 62 with the threshold stored in the nonvolatile memory 68. The integrating circuits 29 and 49 are configured to carryout integration on the outputs of the probes based on the logic in the FPGA (LSI) 62, and store the integration result in the work memory 67. The probes 30 and 52 may be realized based on a monitor signal of the Tx_LSI 64 and the logic in the FPGA (LSI) 62. The attenuator circuit 51 is realized by controlling attenuation via the CPU 66 based on the logic in the FPGA (LSI) 62.

According to the first and second embodiments, the radio resources may be dynamically reallocated to the different mobile communication systems. Further, the radio resources reallocations may be reported via the existing interfaces of the carrier status reports from the shared radio processing apparatuses 15 and 40. Accordingly, applications of the existing system base station control apparatus 11 and the new system radio base station apparatus 13 on the network side may not be largely modified.

According to the first and second embodiments, the radio resources may be dynamically reallocated to the different mobile communication systems.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

1. A communication system for performing communication between a first mobile terminal in a first mobile communication system and a second mobile terminal in a second mobile communication system in a communication area by allocating different carriers to the first and second mobile communication systems, the communication system comprising:
a shared radio processing apparatus shared by the first and second mobile communication systems and configured to carry out radio processing for the first and second mobile communication systems in the communication area,
wherein the shared radio processing apparatus includes
a measuring unit configured to measure power of each of the carriers;
a carrier usage determination unit configured to determine a frequency of carrier usage of each of the carriers based on a measured value of the corresponding carrier measured by the measuring unit;
a carrier status determination unit configured to determine, as a carrier status of the carriers, whether the carriers are allocatable to one of the first and second mobile communication systems based on the frequency of the carrier usage thereof determined by the carrier usage determination unit; and
a reporting unit configured to transmit a carrier status report indicating reallocation of one of the carriers from one of the first and second mobile communication systems to the other mobile communication system based on a result of the determination by the carrier status determination unit, to a base station of each of the first and second mobile communication systems.

2. The communication system as claimed in claim 1,
wherein the carrier usage determination unit compares an integral value obtained by integrating the measured value of each of the carriers for a predetermined period with a predetermined threshold to determine the frequency of the carrier usage of the corresponding carrier.

3. The communication system as claimed in claim 2,
wherein the carrier status determination unit determines reallocating one of the carriers allocated to the first mobile communication system to the second mobile communication system if the frequency of the carrier usage of the one of the carriers allocated to the first mobile system is low and the frequency of the carrier usage of all the carriers allocated to the second mobile system is high.

4. The communication system as claimed in claim 3,
wherein the shared radio processing apparatus further includes
an attenuator unit configured to attenuate the one of the carriers allocated to the first mobile communication system, based on the determination on the reallocation of the one of the carriers allocated to the first mobile communication system to the second mobile communication system determined by the carrier status determination unit and report to the first mobile communication system and the second mobile communication system, after having attenuated the one of the carriers allocated to the first mobile communication system, the determination on the reallocation of the one of the carriers allocated to the first mobile communication system to the second mobile communication system.

5. The communication system as claimed in claim 4,
wherein the carrier usage determination unit includes different thresholds for the first and second mobile communication systems such that the thresholds for the first and second mobile communication systems are compared with the integral values obtained by integrating the measured values of the carriers allocated to a corresponding one of the first and second mobile communication systems for the predetermined period.

6. A shared radio processing apparatus for carrying out radio processing for a first mobile communication system and a second mobile communication system in a communication area of a communication system, the communication system performing communication between a first mobile terminal in the first mobile communication system and a second mobile terminal in the second mobile communication system in the area by allocating different carriers to the first and second communication systems, the shared radio processing apparatus comprising:

a measuring unit configured to measure power of each of the carriers;

a carrier usage determination unit configured to determine a frequency of carrier usage of each of the carrier based on a measured value of the corresponding carrier measured by the measuring unit;

a carrier status determination unit configured to determine, as a carrier status of the carriers, whether the carriers are allocatable to one of the first and second mobile communication systems based on the frequency of the carrier usage thereof determined by the carrier usage determination unit; and a reporting unit configured to transmit a carrier status report indicating reallocation of one of the carriers from one of the first and second mobile communication systems to the other mobile communication system based on a result of the determination by the carrier status determination unit, to a base station of each of the first and second mobile communication systems.

7. The shared radio processing apparatus as claimed in claim 6, wherein the carrier usage determination unit compares an integral value obtained by integrating the measured value of each of the carriers for a predetermined period with a predetermined threshold to determine the frequency of the carrier usage of the corresponding carrier.

8. The shared radio processing apparatus as claimed in claim 7, wherein the carrier status determination unit determines reallocating one of the carriers allocated to the first mobile communication system to the second mobile communication system if the frequency of the carrier usage of the one of the carriers allocated to the first mobile system is low and the frequency of the carrier usage of all the carriers allocated to the second mobile system is high.

9. The shared radio processing apparatus as claimed in claim 8, further comprising:

an attenuator unit configured to attenuate the one of the carriers allocated to the first mobile communication system, based on the determination on the reallocation of the one of the carriers allocated to the first mobile communication system to the second mobile communication system determined by the carrier status determination unit and report to the first mobile communication system and the second mobile communication system, after having attenuated the one of the carriers allocated to the first mobile communication system, the determination on the reallocation of the one of the carriers allocated to the first mobile communication system to the second mobile communication system.

10. The shared radio processing apparatus as claimed in claim 9, wherein the carrier usage determination unit includes different thresholds for the first and second mobile communication systems such that the thresholds for the first and second mobile communication systems are compared with the integral values obtained by integrating the measured values of the carrier allocated to a corresponding one of the first and second mobile communication systems for the predetermined period.

* * * * *